United States Patent Office 3,378,542
Patented Apr. 16, 1968

3,378,542
PURIFYING ESTERS OF POLYHYDRIC ALCOHOLS
Charles J. O'Boyle, Gramercy, La., assignor to North American Sugar Industries Incorporated, New York, N.Y., a corporation of New Jersey
No Drawing. Continuation-in-part of application Ser. No. 263,349, Mar. 6, 1963. This application July 13, 1964, Ser. No. 382,391
15 Claims. (Cl. 260—210)

ABSTRACT OF THE DISCLOSURE

A method for removing extraneous solvents from preparations of polyhydric alcohols is disclosed wherein the ester-containing mass is dispersed in a wash solvent in which the extraneous solvent to be removed is soluble, but in which the ester to be purified is of limited solubility. Wash solvents disclosed in this application are volatile ketones, ethers, esters, and alcohols. Method for the preparation and partial purification of polyhydric alcohol esters are also described.

This application is a continuation-in-part of copending application Ser. No. 263,349, filed Mar. 6, 1963, now U.S. Patent No. 3,141,013.

This invention relates to a process for refining esters of polyhydric alcohols and in particular it is concerned with a method for removing certain solvents which may be mixed with the esters of polyhydric alcohols as impurities.

The invention provides improvements and procedures for the preparation of the esters of solid polyhydric alcohols by which an ester product containing acceptably small amounts of processing solvents may be obtained.

The esters of solid polyhydric alcohols which are to be purified within the scope of this invention are useful as chemical intermediates and surface-active agents. As chemical intermediates they are useful in the preparation of synthetic resins, waxes, drying oils, and lubricants. As surface-active agents, they are useful as emulsifiers, solubilizers, dispersing and wetting agents, textile processing assistants, and ingredients in detergents, cosmetics, pharmaceuticals and foods.

Ester compositions of the type sought to be made and purified have found only limited commercial use, in spite of their value in the applications mentioned above, because of difficulties which have been experienced in isolating and refining them after they have been synthesized.

The ester products described above are generally made by a transesterification reaction between a polyhydric alcohol and an ester (for example, a methyl ester or triglyceride fat) as represented by the equation:

$$ROH + R_1\text{---}CO\text{---}OR_2 \rightleftharpoons RO\text{---}CO\text{---}R_1 + R_2OH$$

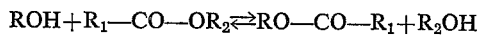

where R represents the residue of the polyhydric alcohol, $R_1$—CO represents the acyl moiety of the ester reagent, and $R_2$ represents the residue of the alcohol moiety of the ester reagent.

The ester products which are within the scope of this invention are ones which contain substantial amounts of monoesterified polyhydric alcohol. In order to obtain these products it is necessary to use a large amount of polyhydric alcohol in the reaction mixture and to have an excess of unreacted polyhydric alcohol in the reaction mass at the end of the synthesis.

To carry out the reaction effectively one or more solvents are required at various stages of the process. Reaction solvents, also referred to as primary solvents, are required in order to get the reagents in the same phase so that the reaction may proceed at a satisfactory rate. To minimize side reactions in the synthesis of esters, moderate temperatures are generally required. Such moderate temperatures further enhance the need for reaction solvents to dissolve the polyhydric alcohol and ester reagents.

The unreacted polyhydric alcohol remaining after the reaction may be separated from the reacted mass by adding another solvent to the reaction mass, known as a secondary solvent, which selectively precipitates the unreacted polyhydric alcohol. Such a process is disclosed and claimed in my copending application Ser. No. 33,116, filed June 1, 1960 (U.S. Patent No. 3,141,012, issued July 14, 1964). The liquor recovered after precipitation is usually distilled to remove most of the secondary or precipitating solvent from the crude product.

In addition to, or in substitution for, the foregoing precipitation step, the crude reaction product may be processed in other ways, including the purification processes described in United State Patent No. 2,893,990. Such steps may introduce processing solvents in addition to the primary reaction solvent.

It is generally desirable to remove as completely as possible the primary and secondary and other processing solvents used in connection with the foregoing procedures, since some of these processing solvents are toxic, or irritating to the eyes and/or skin, and others, even though non-toxic, impart an undesirable odor or flavor to the product.

Furthermore, recovery of the processing solvents is important from an economic standpoint. The solvents required, particularly the reaction solvents, are relatively expensive, and since they add no value to the products, substantially complete solvent recovery is desirable to make the process economically attractive.

As described in my copending application Ser. No. 263,349, of which this application is a continuation-in-part (United States Patent No. 3,141,013, issued July 14, 1964), processing solvents of the foregoing description may be removed by distillation of the reaction mass containing the polyhydric alcohol ester in the presence of oxygenated polar organic solvents which are referred to as "fluxing agents." These oxygenated solvents make it possible to distill the processing solvents to extremely low concentrations, so that their presence will not be objectionable.

However, because the fluxing agents are frequently solvents of relatively low volatility, such as ethylene glycol and glycerine, it may be impractical to remove completely the fluxing agent by distillation. Thus, for instance, a typical polyhydric alcohol ester may be distilled in the presence of a fluxing agent to remove processing solvents and the distillation continued under vacuum until the mass has a temperature of 100°–125° C. at a vacuum of less than 1 mm. Hg pressure. Nevertheless, products containing as little as 1% to 10% of the fluxing agent may still be obtained. However, other products may contain higher concentrations of fluxing agents. In some applications, concentrations in excess of 1% to 10% of the fluxing agent may be undesirable.

Accordingly, it is an object of this invention to provide a method for reducing the concentration of fluxing agents in polyhydric alcohol ester products.

While this invention contemplates generally the separation of polyhydric alcohol esters and the fluxing agents described in my United States Patent No. 3,141,013 mentioned above, for whatever reasons such agents may be admixed with the ester, it is a particular object of this invention to provide a method of improving the purified ester products which are obtained by practicing the process described and claimed in said United States patent.

These and other objects are realized by dispersing a polyhydric alcohol ester containing one or more fluxing solvents (which are described more particularly below)

with a wash solvent to thoroughly contact the former with the latter. Wash solvents within the scope of the present invention are generally volatile oxygenated organic solvents, such as alcohols, ketones, esters and ethers. The ratio of the wash solvent to polyhydric alcohol ester should be in the range of about 1/1 to 8/1. After the ester product is thoroughly contacted with the wash solvent, the mixture of ester product and wash solvent is separated into an ester-rich phase (normally a sediment phase) and a solvent-rich phase, and the solvent-rich phase is removed.

The success of the present invention depends upon the discovery that the wash solvents are miscible with the solvent impurities sufficiently to extract the solvent impurities while, at the same time, the solvents do not dissolve any substantial amount of the polyhydric alcohol ester product.

More specifically, in the process to which the present invention is applicable, esters of solid polyhydric alcohols are prepared by reacting the solid polyhydric alcohol in a transesterification reaction with an ester of an alcohol and a carboxylic acid under conditions to form esters of the solid polyhydric alcohol with the acid and to release the alcohol. The reaction is carried out in the presence of a primary solvent and an alkaline catalyst for the reaction, and preferably utilizes a large excess of solid polyhydric alcohol to promote formation of a large proportion of monoesterified solid polyhydric alcohol.

Generally, the solid polyhydric alcohols which may be employed in the manufacture of esters applicable to the present invention are the polyhydric aliphatic non-reducing alcohols that have at least four free hydroxyl groups, 4 to 18 carbon atoms, and have a melting point of at least about 85° C. They should also be free of groups which interfere with the transesterification reaction. Specific illustrative alcohols include the non-reducing oligosaccharides, such as sucrose and raffinose, pentaerythritol, dipentaerythritol, tripentaerythritol, xylitol, sorbitol, mannitol, lower alkyl glucosides and acetyl glucosamine, N-urea glucoside and N,N-urea diglucoside.

Mixtures of the polyhydric alcohols can also be used. Such mixtures include mixtures of sucrose and raffinose obtained in the refining of beet sugar, mixtures of sorbitol and mannitol which are obtained by reduction of corn sugar and invert sugar, and mixtures of the various pentaerythritols which are obtained by the condensation of acetaldehyde and formaldehyde in the presence of alkaline catalysts.

The acid moiety of the polyhydric alcohol ester is derived from reactants which are esters of aliphatic alcohols, glycols and glycerine on the one hand, and mono-, di- and polycarboxylic acids having from 6 to about 26 carbon atoms on the other hand, the latter being free of groups which interfere with the transesterification reaction and containing no more than two oxygen atoms in addition to those in the carboxyl groups. Typical ester reactants include, but are not limited to, tallow and other fats, cottonseed oil, coconut oil, oiticica and castor oils and other vegetable oils, and marine oils such as fish and whale. Other reactants include esters of tall oil fatty acids, methyl salicylate, methyl esters of rosin acids, methyl esters of naphthenic esters derived from petroleum, the ester component of various vegetable waxes such as carnauba and sugar cane wax, ethyl stearate, dimethyl itaconate, dibutyl adipate, dimethyl azelate, the isomeric dimethyl phthalates, methyl esters of di- and tri-basic acids which are obtained by polymerization of mixtures of mono-, di- and tri-unsaturated fatty acids, methyl esters of the tri- and polybasic acids which can be prepared by condensation of methyl esters of maleic and fumaric acids with the methyl esters of oleic, linoleic and other unsaturated fatty acids, ethyl esters of the tallow fatty acids, and mixtures of these esters.

Excellent results are generally obtained with refined mixed esters of saturated fatty acids such as the single, double and triple pressed grades of stearic acid of commerce. Mixtures consisting largely of arachidic and behenic acids derived from fish or rapeseed oils by hydrogenation and fractionation are another group of mixed acids particularly suitable for the present invention. While naturally occurring mixtures may be used, the ester component may also be relatively pure, e.g., esters of capric, lauric, myristic, palmitic, arachidic, behenic and lignoceric acids.

A number of primary reaction solvents may be used for the transesterification reaction. Useful primary solvents are described in detail in my above-mentioned United States Patent No. 3,141,013. Four groups are defined. These are briefly summarized as follows:

The first group consists of mono- and dialkyl and alkoxy-alkyl amides of lower fatty acids, the amides containing from 3 to 8 carbon atoms. The group includes dimethyl formamide, dimethyl acetamide, N-n-amyl N-methyl formamide, N,N-di(methoxyethyl)formamide, N-methyl N-ethoxyethyl formamide, and N-methyl formamide.

The second group is composed of amides of lower fatty acids in which the nitrogen forms part of a heterocyclic ring system. This group of primary solvents includes N-formly morpholine, N-acetyl morpholine, N-propionyl morpholine, dimethyl N-formyl morpholine, N-formyl piperidine and N-acetyl piperidine.

The third group of primary solvents are tertiary amines having one, two or three alkoxy-alkyl radicals, and having less than 9 carbon atoms. Examples includes dimethyl methoxyethyl amine, methyl dimethoxyethyl amine, dimethyl ethoxyethyl amine, methyl ethyl methoxyethyl amine, dimethyl 2-methoxypropyl amine, and tri(methoxyethyl)amine.

The fourth group of primary solvents are the N-alkyl pyrrolidones and caprolactams. Examples include N-methyl-2-pyrrolidone, N-butyl pyrrolidone, and N-methyl caprolactam.

Mixtures of the primary reaction solvents described above may also be used.

After the transesterification reaction has terminated, any reaction catalyst present should be deactivated if a product containing a high proportion of monoester is desired. If, as is customary, an alkaline catalyst is employed, the catalyst may be deactivated by the addition of an acid such as those described in my U.S. Patent No. 3,141,013. As an alternative, the reaction mass may be maintained at the reaction temperature for a period of time sufficient to consume the alkaline catalyst by a saponification reaction.

After deactivating the catalyst, the reaction mass is subjected to one or more purification steps. It is these steps which introduce the fluxing agents which the present invention is adapted to remove.

As has already been mentioned, it is particularly contemplated that the fluxing agents will be added as a part of the fluxing process described in my aforementioned U.S. patent. Thus, as disclosed in that patent, the fluxing agent is incorporated into the crude reaction mass containing some residual primary reaction solvents. The mass, including the fluxing agent, is thereafter subjected to distillation to remove a substantial portion of the residual primary reaction solvent. Generally, distillation is carried out at a temperature below 140° C., and may be carried out under vacuum.

Depending on the volatility of the fluxing agent, and the distillation conditions, the product resulting from the stripping step may contain as little as 1% of the fluxing agent. However, it may not always be convenient or practical to strip the fluxing agent so completely from the ester product. Some fluxing agents may be too low in volatility to be removed conveniently by distillation. Moreover, even if the fluxing solvent is sufficiently volatile so that low concentrations could be obtained by distillation, it may be convenient not to do so in order to obtain thereby a relatively fluid product which can be handled more readily than a product which has been substantially freed of the fluxing agent.

The fluxing agent imprities which may be removed successfully by the present invention are one or more solvents selected from the group consisting of (a) The aliphatic diols having 2 to 6 carbon atoms, and esters of these diols with the lower fatty acids which have from 2 to 4 carbon atoms in the molecule. These materials include ethylene glycol, the propylene glycols, the butane diols, triethylene glycol, dipropylene glycol, 2,2-dimethyl-1,3-butanediol and esters of these compounds with acetic, propionic, butyric, and isobutyric acids in which one or both of the hydroxyls of the diol are esterified.

(b) The aliphatic triols having from 2 to 6 carbon atoms and esters of these triols with the lower fatty acids which have from 2 to 4 carbon atoms in the molecule. These materials include glycerine, the butane triols, 1,2,6-hexanetriol, and esters of these compounds with acetic, propionic, butyric and isobutyric acids in which 1, 2 or 3 of the hydroxyls of the triol are esterified.

(c) Esters of aliphatic dicarboxylic acids, having from 4 to 6 carbon atoms, and malic acid with lower monohydric primary and secondary aliphatic alcohols, the esters having from 5 to 10 carbon atoms in the ester molecule. Suitable lower monohydric alcohols are those having from 1 to 4 carbon atoms inclusive. Full esters and partial esters are included. Specific examples include mono- and diesters of mehtyl, ethyl, propyl or butyl alcohols with the following acids: fumaric, maleic, succinic, adipic, and itaconic.

(d) Esters of methyl and ethyl alcohols with aconitic, tartaric and citric acids.

(e) Esters of lactic acid with the lower primary and secondary aliphatic monohydric alcohols having from 3 to 6 carbon atoms; also esters with the aliphatic diols having from 2 to 6 carbon atoms in which only one hydroxyl of the diol is esterified.

(f) Esters of acetoacetic acid and levulinic acid with the primary and secondary aliphatic monohydric alcohols which have from 1 to 5 carbon atoms; also esters with the aliphatic diols having from 2 to 6 carbon atoms in which only one hydroxyl of the diol is esterified.

In the practice of this invention, it is generally desired that the reaction solvents described above, should be in a low concentration, preferably not exceeding about 15% based on the weight of the polyhydric alcohol ester. As has already been mentioned, the success of the present invention depends on employing a wash solvent which will not dissolve any appreciable quantity of the polyhydric alcohol ester. The presence of significant amounts of reaction solvents may seriously interfere with this objective. Particularly with the more soluble esters, the presence of more than about 15% of the reaction solvent will tend to disperse or solubilize the polyhydric alcohol ester. This will make it difficult subsequently to separate the washed ester from the wash solvent.

It should be recognized, however, that it is not absolutely essential in all instances to reduce the level of reaction solvents below the 15% level. For instance, if the wash solvent has a relatively poor solubility for the product ester, or, if the product ester crystallizes easily, larger amounts of unremoved reaction solvent may be tolerated.

As has already been mentioned, a particular object of this invention is to remove the fluxing agents from the polyhydric alcohol ester following the distillation process described in my United States Patent No. 3,141,013. Since that process will normally remove substantially all of the relatively volatile reaction solvents, there would normally be little need for concern as to the amounts of reaction solvent which may be present. On the other hand, if the ester product is worked up by other methods, which may not necessarily completely remove the reaction solvent, some attention should be given to this problem.

Generally, the ester product should also not contain more than about 50% fluxing agent, based on the weight of the ester product because large amounts of fluxing agent tend to make the separation of the ester product and wash solvent difficult. If higher ratios of wash solvent to ester product are employed, and/or low separation temperatures are employed, esters containing up to about 50% fluxing agent, or in some instances possibly more, may be processed satisfactorily. If lower amounts of fluxing agents or higher separation temperatures are used, it is generally preferred to limit the amount of fluxing agent to about 20% or lower.

Wash solvents which may be employed in the present invention are, generally, the relatively volatile oxygenated organic solvents. More specifically, the wash solvents contemplated consist essentially of at least one solvent selected from the group consisting of alkanols having a boiling point below 120° C., dialkyl ketones having boiling points below about 120° C., the dialkyl ethers having up to 7 carbon atoms, and esters of alkanols with lower fatty acids, the esters having up to six carbon atoms in the ester molecule.

Typical compounds within the aforementioned groups include, but are not limited to, methanol, ethanol, propanol, isopropanol, normal and isobutanol secondary butyl alcohol, and some amyl alcohols, acetone, methyl isopropyl ketone, methyl isobutyl ketone, diethyl ketone, dialkyl ethers having from 1 to 3 carbon atoms in the alkyl group, i.e. dimethyl, diethyl, dipropyl and diisopropyl ethers, unsymmetrical ethers such as methyl propyl ether and ethyl isobutyl ether, the esters of the $C_1$–$C_3$ acids with the $C_1$–$C_3$ alcohols, i.e. methyl and ethyl esters of formic acid, ethyl acetate, propyl acetate, and propyl propionate, as well as esters such as methyl and ethyl butyrate.

It is contemplated that the wash solvent according to this invention will consist essentially of the foregoing oxygenated hydrocarbon solvent, i.e. the solvent will be free of materials which would interfere with the effectiveness of these solvents to remove the fluxing agent, and or which would cause solution of excessive amounts of ester product. Accordingly, for best results with all of the esters and fluxing agents mentioned above, the wash solvent should not normally contain more than about 30% water, brine or alkane hydrocarbons.

As disclosed in my copending applications Ser. No. 382,392, filed July 13, 1964; Ser. No. 382,393, filed July 13, 1964, and Ser. No. 382,394, filed July 13, 1964 (filed concurrently herewith), water, brine and alkane hydrocarbon solvents are also useful as wash solvents with particular classes of fluxing agents and esters. Thus, the alkane hydrocarbon solvents may be employed as wash solvents for those fluxing agents which are lipophile, for instance, the fully esterified fluxing agents. Water is useful as a wash solvent for the hydrophilic fluxing agents (generally the diols, triols and partial esters). Because a number of the ester products have significant water solubility, however, water is useful as a wash solvent with only a limited group of esters characterized generally by fatty acid groups having a titre of at least about 50° C. Salt solutions may be employed with a larger class of esters than pure water because of the insolubilizing effect of salts on the polyhydric alcohol esters; however, salt solutions may be employed only with the hydrophilic fluxing agents.

From the foregoing, it will be obvious that most of the esters and fluxing agents described above may be separated by a wash solvent consisting essentially of the oxygenated organic solvents mentioned above or another wash solvent which may consist essentially of water, a salt solution or an alkane hydrocarbon, either concurrently or successively, depending on the materials to be separated. The use of such variations constitutes the simultaneous or successive practice of both the invention claimed herein and the invention claimed in one of my aforementioned copending applications. Where the presence of extraneous solvents such as another wash solvent will not have a substantial adverse effect on the relative solubilities of the ester and fluxing agent in the wash solvents of this invention, which consists essentially of the oxygenated hydrocarbons mentioned above, the phrase "consisting essentially of" as used herein and in the appended claims contemplates that the invention claimed in this application may be practiced simultaneously with the inventions claimed in said copending applications by the use of an oxygenated hydrocarbon wash solvent mixed with up to 50% or more of another type of wash solvent.

In the broadest aspects of this invention, the ester product containing a solvent impurity is dispersed in the wash solvent. The method or time of adding the wash solvent is not important for the purposes of the present invention. However, the wash solvents as described above are normally volatile (and indeed in the case of dimethyl ether, must be employed under refrigeration and/or pressure to obtain a liquid). Accordingly, if the polyhydric alcohol ester is worked up by a method including a distillation step, the wash solvent cannot normally be added until after distillation has been completed. Thus, for instance, as applied to the purification of the product of the process disclosed and claimed in my United States Patent No. 3,141,013, the volatile wash solvents will be added after the fluxing process has been completed.

Generally, any temperature up to the boiling point of the wash solvent may be employed. Heating of the solvent is not required. However, moderate warming may help impart fluidity to the mass during agitation and thereby improve the thoroughness of washing.

Depending on the ester product, the wash solvent and their relative proportions to each other, sufficient heating may result in partial or complete solution or colloidal dispersion of the ester in the wash solvent. Such a result will lead to particularly effective washing. However, in this event subsequent cooling will be required to separate the washed ester from the wash solvent.

If highly volatile solvents are employed, such as dimethyl ether mentioned above, the washing process may be carried out at super-atmospheric pressures and/or under refrigeration to liquefy the solvent.

To obtain efficient dispersion, agitation of the mass is preferred. Agitation is continued until the ester product has been thoroughly contacted with the wash solvent. Generally, a substantially uniform mass will be obtained. If the ester product has been prepared by the fluxing process, or by any other process resulting in a relatively dry, solid mass, adding it to the wash solvent, it is desirable to break up the product so that the largest lumps are not more than about ½" in diameter to promote a more rapid dispersion of the ester product in the wash solvent. Thereafter, the wash solvent is added, and the mixture agitated. The time required may range from less than 10 minutes to more than an hour although this will vary widely depending upon the initial condition of the mass before it has been added to the wash solvent, the temperature of dispersion and the equipment employed.

After the wash solvent and polyhydric alcohol ester have been thoroughly contacted with each other, the mixture is separated into a solvent-rich phase and a product-rich phase and the solvent-rich phase is removed. The solvent-rich phase will normally be a relatively clear, supernatant liquid.

The product-rich phase is, on the other hand, usually in the form of a sediment or cake. It will be understood that by referring to a product-rich "phase," I do not mean to imply that the ester is necessarily dissolved or colloidally dispersed in the wash solvent. I refer merely to the fact that the ester product will separate from the bulk of the wash solvent under the influence of gravitational or like forces into a separate cake, paste, or sediment as a solid or semi-solid phase which generally contains some of the wash solvent dispersed therein.

To obtain adequate phase separation, it may be helpful to cool the ester-wash solvent mass. This is discussed more completely below.

Depending on the method of separation, the product-rich phase may range anywhere from a hard, wax-like solid to a pasty mass. In a few cases, a crystalline or particulate solid may be obtained. The most convenient method of separating the solvent from the product is to employ sedimentation, i.e. to use simple gravitational settling or centrifuging. If the solid is particulate, filtration can also be used. However, experience has shown that the product-rich phase for many systems has a plastic characteristic which renders filtration an impractical method of separation.

After the mixture of ester product and wash solvent has separated into two phases, at least a portion of the solvent-rich phase is removed. The solvents contained in this phase are subsequently recovered by fractional distillation. The wash solvent thus recovered may be reused in the washing processes already described. The fluxing agent solvent will also be recovered with the wash solvent, and the fluxing agent thus recovered may likewise be employed again in the processing of the polyhydric alcohol ester product.

The product-rich phase may contain greater or lesser amounts of wash solvent depending upon the efficiency of the method of separation. The product is dried to remove the wash solvent, and the wash solvent recovered is recycled to the process.

Drying of the polyhydric alcohol ester product may be carried out in an agitated vessel, such as Sigma-blade mixer. Stripping may be continued until the temperature is in excess of around 100° C., and completed under a vacuum which is as low as may be practically obtained with the vacuum equipment available. This will permit the recovery of the greatest amount of wash solvent, and yield an ester product containing the lowest possible percentages of solvents. To avoid degradation of the product, stripping temperature should not normally exceed about 140° C.

It is not necessary, however, that the product be stripped following removal of the solvent phase. It is contemplated, for instance, that mixtures of polyhydric alcohol and wash solvent in the form of a paste may be employed commercially because such materials can be readily handled. In the event that the ester product is employed as a paste, it is obvious that the wash solvent selected should be one which is compatible with the subsequent use to be made of the ester product.

Particularly where the wash solvent is methanol, ethanol, a propanol, acetone, methylethyl ketone or an ester having up to 6 carbon atoms of the $C_1$ to $C_4$ alkanols and the $C_1$ to $C_4$ alkanoic acids, such as methyl, ethyl or n-butyl acetate, methyl or ethyl propionate, or butyl acetate, or mixtures of the foregoing, pastes or solutions containing up to about 50% solvent are useful in the food industry. The substantially dry solids are difficult to disperse uniformly in vegetable and animal fats, oils and similar substances (i.e. chocolate) used in baked goods, frozen desserts such as ice cream or mellorine, candies, and other food products. The pastes or solutions, however, are easily dispersed, and are, therefore, especially adapted for use in the foregoing applications.

As already mentioned, the ratio of wash solvent to ester should be between about 1/1 and 8/1. In selecting a suitable ratio, the solubility of the ester product in the wash solvent should be considered. If a good solvent is employed, to prevent excessive solubilization of the ester product, and the concomitant excessively large proportions of ester which would dissolve into the solvent phase, high ratios of solvent to ester should be avoided. On the other hand, if the wash solvent is one which has already a very low solubility for the ester product, it may be preferred to employ as high a ratio as possible in order to obtain the most effective washing of the fluxing agent remaining in the polyhydric alcohol ester.

The amounts of reaction solvent and fluxing agents present will also affect the solubility of the ester product in the wash solvent. If large quantities of such solvents are present, a larger proportion of wash solvent will be required to obtain a good recovery of the ester product in the product-rich phase, and to obtain a product-rich phase having a reduced content of fluxing agents.

In some cases, i.e. where the fluxing agent has been stripped to a low level, it may be possible to use a ratio of wash solvent to ester of as little as 1/1. Such ratios, however, tend to result in a relatively heavy mass of wash solvent and ester. This renders mixing of the mixture more difficult. It is usually preferred to use a wash solvent to ester ratio between about 1.5/1 and 5/1.

While the washing step, itself, may be carried out at any convenient temperature, it is preferable that the mass not be excessively warm when the separation is made. To this end, the wash solvent-ester mass may be chilled before separation to a temperature below around 20° C.–30° C. However, for maximum product recovery, lower temperatures are preferred.

As mentioned, if the ester product contains a large amount of fluxing agent it will be particularly important to use lower separation temperatures for optimum efficiency. This is also particularly important if smaller ratios of wash solvent to ester are used.

The washing process of the present invention may be conveniently carried out batch-wise (and is thus illustrated in the examples below). However, it will be recognized that this invention is not so limited. Thus, for instance, continuous washing equipment might be provided. More importantly, the wash may also be carried out as a countercurrent extraction, such as a multi-stage process. While the use of a countercurrent process will necessarily require the use of more complex and expensive equipment than would a simple batch-wise process, it is possible to obtain much more efficient separation in this manner.

For a better understanding of this invention, reference may be had to the following examples.

Example 1

A sucrose monotallowate was prepared in accordance with the process described generally in my U.S. Patent No. 3,141,013. Dimethyl formamide was employed as the reaction solvent. After the transesterification reaction had been completed, the mass was neutralized by the addition of citric acid and unreacted sucrose was precipitated by the addition of secondary solvent. The mother liquor recovered, containing dissolved sucrose montallowate, was evaporated to substantial dryness.

Thereafter propylene glycol was added as a fluxing agent, and stripping of reaction solvent from the ester product was continued. The final product thereby obtained contained about 0.02% dimethyl formamide and about 4% to 5% propylene glycol. The balance was solids plus a small amount of water. The solids were largely (in the order of 70%) monoester. The balance of the solids was diesters and higher esters of sucrose, sucrose and methyl esters of tallow acids.

A sample of 325 lbs. of this product was ground so that is passed through a ⅛ inch screen and was then added to a vessel containing 1240 lbs. of acetone. The acetone initially had a temperature of about 35° C.

The mass of acetone and ester product was agitated until a uniform mass was obtained. During agitation it was warmed to about 50° C. After a substantially uniform mass had been obtained, the entire mass was cooled to about 13° C. to 15° C. and centrifuged. The supernatant liquid, containing largely acetone, was removed from the centrifuge.

The acetone recovered contained about 6.6% solids and about 1% propylene glycol. The acetone was distilled. The propylene glycol recovered could be employed again in the fluxing process. The acetone recovered could be employed again in the washing step just described.

By evaporating the acetone to dryness, a dried residue consisting largely of sucrose monotallowate, higher sucrose esters and methyl esters of tallow fatty acids was obtained which was suitable for recharging to a subsequent sucrose tallowate synthesis batch as partial replacement for the sucrose and methyl esters of tallow acids in the charge.

The cake recovered from the centrifuge was stripped in a Sigma-blade mixer. The initial pressure of stripping was one atmosphere. However, as the stripping continued, the mixer was evacuated. Stripping was continued until the pressure was reduced to 0.8 mm. Hg and the stripping temperature was 110° C.

The product obtained from this process was brittle and dry, and could be readily ground to a powder. By contrast, the original product contained substantial amounts of propylene glycol and because of this was hygroscopic. Thus, the original product on exposure to the atmosphere absorbed water and became sticky and was, therefore, difficult to grind, and if ground, it readily sintered into a solid block on standing.

As an alternative to drying, the centrifuge cake containing about 25% acetone could be employed directly as a viscous liquid in which sucrose esters were partly dissolved and partly crystalline. The mass could be used in food products as described above where easy dispersibility in vegetable oils and similar products is desired.

The following table illustrates further examples of the manner in which the process may be carried out. Specified in the table are the ester product treated, the fluxing agent impurity which was removed, and the ratio of wash solvent to ester. In each of these examples the procedure generally outlined in Example 1 may be conveniently employed.

| Example No. | Polyol Ester [1] | Fluxing Solvent [2] | Wash Solvent | Wash Solvent/Ester Ratio | Separation Temperature, ° C. |
|---|---|---|---|---|---|
| 2 | Sorbitol caprate [3] | Triacetin | Diethyl ether | 4/1 | −5 |
| 3 | Xylitol ester of herring oil | Glycerine | Methanol | 5/1 | −25 |
| 4 | Raffinose palmitate | Butyl lactate | Ethyl acetate | 5/1 | −15 |
| 5 | Mannitol stearate [3] | Monoethyl fumarate | Methyl ethyl ketone | 10/1 | −10 |
| 6 | Methyl glucoside oleate | Diethyl malate | n-Butanol-acetone 1:2 wt. ratio | 3/1 | −10 |
| 7 | Sucrose cocoate | Propylene glycol | Methyl ethyl ketone-hexane 4:1 wt. ratio | 3/1 | −20 |
| 8 | Sucrose ester of hydrogenated tallow acids | Trimethyl citrate | Methyl ethyl ketone | 4/1 | 0 |
| 9 | Sucrose ester of olive oil fatty acids [4] | Ethyl levulinate | Ethanol | 2.5/1 | −20 |

[1] The product ester content of these preparations is more than 50% by weight monoesterified polyhydric alcohol, but substantial amounts of di- and polyesterfied polyhydric alcohol esters may be present.
[2] Generally between about 5% and 20% by weight.
[3] Substantially free of sorbitans.
[4] This material was not dried after centrifugation. After warming to room temperature it was a liquid product containing about 25% ethanol.

In addition to the foregoing examples, various other wash solvents may be used. For instance, a propanol, secondary butyl alcohol, diethyl ketone or methyl isopropyl ketone may be substituted for the wash solvent and used under the conditions of Example 7 for purifying an ester consisting essentially of sucrose stearate.

Although the invention has been described with refer-

I claim:

1. In a process for refining polyhydric alcohol esters of solid polyhydric alcohols and carboxylic acids, said ester having been synthesized by a transesterification reaction between a polyhydric alcohol and an ester reactant, said polyhydric alcohol containing from 4 to 18 carbon atoms, and at least 4 hydroxy groups, and having a melting point of at least 85° C., and the acid moiety of said ester reactant containing from about 6 to about 26 carbon atoms, being free of groups which interfere with the transesterification reaction, and containing no more than two oxygen atoms in addition to those in the carboxy group, said ester being admixed with not more than about 15% of a primary reaction solvent, based on the weight of the polyhydric alcohol ester, and up to about 50%, based on the weight of the polyhydric alcohol ester, of at least one fluxing agent selected from the group of oxygenated polar organic solvents consisting of (a) The aliphatic diols having 2 to 6 carbon atoms, and esters of these diols with the lower fatty acids which have from 2 to 4 carbon atoms in the molecule, (b) The aliphatic triols having from 2 to 6 carbon atoms and esters of these triols with the lower fatty acids which have from 2 to 4 carbon atoms in the molecule, (c) Esters of aliphatic dicarboxylic acids having from 4 to 6 carbon atoms and malic acid with lower monohydric primary and secondary aliphatic alcohols having from 1 to 4 carbon atoms, the esters having from 5 to 10 carbon atoms in the ester molecule, (d) Esters of methyl and ethyl alcohols with aconitic, tartaric and citric acids, (e) Esters of lactic acid with the lower primary and secondary aliphatic monohydric alcohols having from 3 to 6 carbon atoms, and esters with the aliphatic diols having from 2 to 6 carbon atoms in which only one hydroxyl of the diol is esterified.

(f) Esters of acetoacetic acid and levulinic acid with the primary and secondary aliphatic monohydric alcohols which have from 1 to 5 carbon atoms, and esters with the aliphatic diols having from 2 to 6 carbon atoms in which only one hydroxyl of the diol is esterified, the improvement comprising dispersing said ester in an amount of a wash solvent between about 1 and 8 times the weight of the polyhydric alcohol ester, said wash solvent consisting essentially of at least one oxygenated hydrocarbon solvent selected from the group consisting of alkanols having a boiling point below 120° C., dialkyl ketones having boiling points below about 120° C., the dialkyl ethers having up to 7 carbon atoms, and esters of alkanols with lower fatty acids having 6 carbon atoms in the ester molecule and to thoroughly contact said polyhydric alcohol ester with said wash solvent and to obtain thereby a washed mass, separating said washed mass into a solvent-rich phase comprising said wash solvent and fluxing agent and an ester-rich phase, removing at least a portion of said solvent-rich phase from the washed mass, and recovering said washed mass containing the purified polyhydric alcohol ester.

2. A process according to claim 1 wherein said wash solvent consists essentially of a dialkyl ether having from 1 to 3 carbon atoms in the alkyl group.

3. A process according to claim 1 wherein said wash solvent consists essentially of an ester of an alkanol having from 1 to 3 carbon atoms with a lower fatty acid having from 1 to 3 carbon atoms.

4. A process according to claim 1 wherein said ester sucrose stearate and said oxygenated polar organic solvent is propylene glycol.

5. A process according to claim 1 wherein said polyhydric alcohol ester is sorbitol caprate and said polar organic solvent is glycerol triacetate.

6. A process according to claim 1 wherein said polyhydric alcohol ester is the xylitol ester of herring oil and said oxygenated polar organic solvent is glycerine.

7. A process according to claim 1 wherein said polyhydric alcohol ester is raffinose palmitate and said polar organic solvent is butyl lactate.

8. A process according to claim 1 wherein said polyhydric alcohol ester is mannitol stearate and said oxygenated polar organic solvent is monoethyl fumarate.

9. A process according to claim 1 wherein said polyhydric alcohol ester is methyl glucoside oleate and said polar organic solvent is diethyl maleate.

10. A process according to claim 1 wherein said polyhydric alcohol ester is sucrose cocoate and said polar organic solvent is propylene glycol.

11. A process according to claim 1 wherein said polyhydric alcohol ester is the sucrose ester of hydrogenated tallow acids and said polar organic solvent is trimethyl citrate.

12. A process according to claim 1 wheren said polyhydric alcohol ester is the sucrose ester of olive oil fatty acids and said polar organic solvent is ethyl levulinate.

13. A process accordng to claim 1 wherein the ratio of polyhydric alcohol ester to wash solvent is between 1.5:1 and 5:1 based on the weight of the ester product and wherein the washed mass is separated into a product-rich phase and a solvent-rich phase at a temperature which does not exceed about 30° C.

14. The process of claim 1 wherein said wash solvent consists essentially of a material selected from the group consisting of methanol, ethanol, propanol, and secondary butanol.

15. The process of claim 1 wherein said wash solvent consists essentially of a material selected from the group consisting of acetone, methyl ethyl ketone, diethyl ketone, and methyl isopropyl ketone.

References Cited

UNITED STATES PATENTS

| | | | |
|---|---|---|---|
| 2,857,378 | 10/1958 | Hales et al. | 260—234 |
| 2,948,717 | 8/1960 | Babayan et al. | 260—234 |
| 3,219,484 | 11/1965 | Smythe et al. | 260—234 |

LEWIS GOTTS, *Primary Examiner.*

J. R. BROWN, *Assistant Examiner.*

UNITED STATES PATENT OFFICE

CERTIFICATE OF CORRECTION

Patent No. 3,378,542 April 16, 1968

Charles J. O'Boyle

It is certified that error appears in the above identified patent and that said Letters Patent are hereby corrected as shown below:

Column 1, line 20, "Method" should read -- Methods --. Column 2, line 6, "reacted" should read -- reaction --. Column 4, line 13 and Column 9, line 50, "3,141,013", each occurrence, should read -- 3,141,012 --. Column 4, line 30, "includes" should read -- include --. Column 5, line 4, "imprities" should read -- impurities --; line 30, "mehtyl" should read -- methyl --. Column 11, line 63, before "fluxing" insert -- said --.

Signed and sealed this 19th day of August 1969.

(SEAL)

Attest:

Edward M. Fletcher, Jr.
Attesting Officer

WILLIAM E. SCHUYLER, JR.
Commissioner of Patents